May 3, 1927.  W. DUBILIER  1,627,493
ELECTRICAL CONDENSER
Filed Feb. 28, 1925
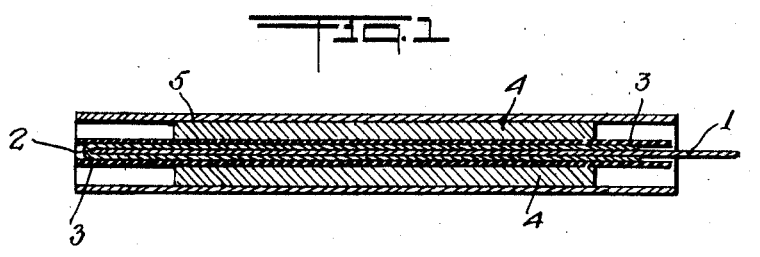
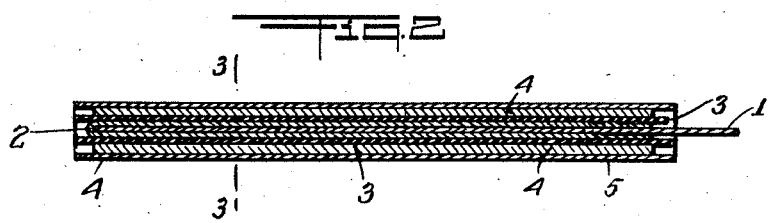
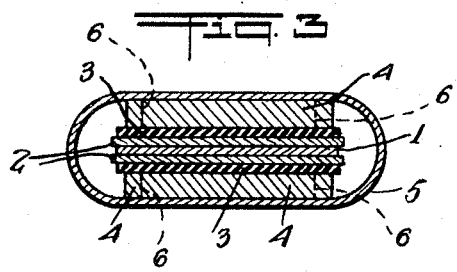
INVENTOR
WILLIAM DUBILIER
BY
Van Deventer & Hickel
ATTORNEYS Patented May 3, 1927.

1,627,493

UNITED STATES PATENT OFFICE.

WILLIAM DUBILIER, OF NEW ROCHELLE, NEW YORK, ASSIGNOR TO DUBILIER CONDENSER CORPORATION, OF NEW YORK, N. Y., A CORPORATION OF DELAWARE.

ELECTRICAL CONDENSER.

Application filed February 28, 1925. Serial No. 12,276.

This invention relates to improvements in electrical condensers especially condensers of constant electrostatic capacity.

An object of this invention is to provide a condenser of simple construction, easy and inexpensive to make, and of such design that its capacity thereof can be determined and fixed within the limits of greatest accuracy while the condenser is in the process of manufacture; as well as a novel method by which such results can be obtained.

The nature and advantages of the invention are fully set forth in the following description with the accompanying drawings which disclose the preferred manner in which my invention is practiced. But I of course reserve the right to make changes not necessarily described herein, but consistent with the principle of the invention, as indicated by the broad and general meanings of the terms of the appended claims.

On the drawings,

Figure 1 is a longitudinal sectional view showing a partly finished condenser according to my invention;

Figure 2 is a similar section of the completed and tested condenser; and

Figure 3 is a section on the line 3—3 of Figure 1.

The same numerals identify the same parts throughout.

To make a condenser according to this invention, I take a plate or sheet of electrically conductive material 1, and fold over one edge of it a sheet of metal foil 2, this foil to cover both faces of the sheet 1 over nearly all of the area thereof. The metal sheet 1 may be a sheet of copper foil, and the foil 2 may be tin foil, or any other suitable material. Upon the tin-foil 2 on both sides of the copper foil 1, I lay sheets of insulation such as gauged mica 3, and against the sheets of insulation 3, I place sheets or plates of some conductive material or metal that is easily deformable, such as lead, indicated by the numeral 4. The sheets of foil 1 and 2 with the insulation 3 and the lead blocks or plates 4 in the relative positions just mentioned are then inserted into a section of flattened tubing 5 open at both ends, and also consisting of some suitable conductive material or metal which, like the lead plates 4, can easily be deformed and expanded by pressure, and when such pressure is removed, will retain the shape and position which has been imparted to it.

When the parts of the condenser have been assembled as set forth, the condenser as shown in Figure 1 is placed in a vise or similar appliance capable of compressing the tubing 5 and its contents. The sheets of foil 1 and 2 will constitute one element or armature of the condenser and the lead plates 4 and metallic casing 5 will constitute the other. One end of the sheet of foil 1 will project from the casing 5 and this end can be joined to one terminal of an electric circuit, the other terminal of which can be affixed to the tubing. This circuit will contain suitable appliances including a device for measuring capacity and when pressure is applied to the exterior of the casing 5 on opposite sides of same, the change in the capacity can be noted as the operation of manufacturing and finishing the condenser proceeds. When the pressure is increased, the casing 5 is flattened to a greater extent, and the lead blocks 4 are also deformed and spread out over a larger area; thereby coming into proximity to a larger portion of the surface of the foil 2 on the two faces of the foil 1, and making firm and uniform contact with the mica sheets 3. At the same time, the mica sheets 3 and the sheets of foil 1 and 2 are pressed more tightly together, and any air spaces or voids inside of the condenser are eliminated. The pressure on the outside of the casing 5 is increased gradually and the measuring device in the circuit watched as it indicates that the capacity of the condenser is correspondingly increasing, until the exact value of the capacity desired is attained. At this point, the pressure may be removed and the material of the tubing 5 and blocks 4 remain set in the shape and positions which the pressure has forced them to assume. Likewise, the sheets of insulation 3 retain their exceedingly intimate contact with the foil 2, and the sheets of foil 1 and 2 stick close to each other.

The capacity of the condenser is of course adjusted so that when the pressure is first exerted on the outside of the casing 5, it will be less than the capacity desired. The pressure is then made greater bit by bit, so that the capacity is gradually increased until it has the required value. This value is then maintained by the condenser and undergoes no change in practice because the soft metals making up the two separate elements or armatures of the condenser become permanently set by the operation to which they are subjected, and when the condenser is finished, they do not resume their original relative positions or shapes. The tubing 5 and lead blocks 4 are not only spread out to some extent, but the metal of the blocks 4 as well as the foils 1 and 2 become embedded in the surface of the mica sheets 3, and stick closely thereto, while equally good contact between the foils 1 and 2 and the blocks 4 and casing 5 is obtained.

In Figure 3, the vertical broken lines 6 show the original width of the lead plates 4 as in Figure 1 before compression.

By means of such a condenser and the process of making the same, a condenser of very accurate capacity, even in small sizes, can be readily and cheaply produced.

Having described my invention, what I believe to be new and desire to secure and protect by Letters Patent of the United States is:—

1. An electrical condenser comprising elements to be of different potential, said elements having such physical characteristics that they can be caused by the use of force while the condenser is in the course of manufacture, to expand into the desired operative relations and maintain such relations when the force is removed.

2. An electrical condenser comprising elements to be of different potential, part of said elements being easily deformable so that when the condenser is in the course of manufacture, the elements can be caused by the use of force, to expand into the desired relative positions and operative area to give the capacity desired.

3. A condenser comprising two elements of conductive material separated by insulation, one of said elements comprising a relatively soft substance, which can be deformed and expanded by pressure in the finishing of the condenser and thus caused to distend, to impart to the condenser the capacity required.

4. An electrical condenser comprising an element consisting of metal foil with sheets of insulation on both faces thereof, and a sheet or plate of soft metal engaging each of the sheets of insulation; said sheets of soft metal being easily deformable by pressure, to distend to impart thereto the necessary operative area and relative position, to give the capacity required within accurate limits.

5. An electrical condenser comprising an element consisting of metal foil, sheets of insulation on both faces of said element, a plate of easily deformable metal engaging each sheet of insulation, and a tubular casing enclosing said element, said casing and said sheets of deformable metal being capable of being flattened and expanded by pressure, and thus distended to set the parts of the condenser in the positions which will afford the capacity required.

6. The method of manufacturing a condenser which consists in assembling the condenser, and then finishing the condenser by exerting force thereon, to distend some of the parts and set the parts thereof in the required relation and impart accurate capacity thereto.

7. The method of manufacturing a condenser which consists in assembling the parts of the condenser comprising relatively soft deformable conductive material, enclosing said parts in a deformable casing and then exerting pressure upon the exterior of said casing to change the shape thereof and set the casing and distend the deformable material therein, so as to give the capacity required.

Signed at New York in the county of New York and State of New York this 27th day of February A. D. 1925.

WILLIAM DUBILIER.